United States Patent
Hammonds

(10) Patent No.: US 6,830,114 B2
(45) Date of Patent: Dec. 14, 2004

(54) OMNI DIRECTION VEHICLE WITH MATERIAL HANDLING TOOL

(76) Inventor: Carl L. Hammonds, 7358 Pine Hollow Dr., Humble, TX (US) 77395

( * ) Notice: Subject to any disclaimer, the term of this patent is extended or adjusted under 35 U.S.C. 154(b) by 0 days.

(21) Appl. No.: 10/687,723

(22) Filed: Oct. 17, 2003

(65) Prior Publication Data

US 2004/0079560 A1 Apr. 29, 2004

Related U.S. Application Data

(60) Continuation-in-part of application No. 10/371,328, filed on Feb. 20, 2003, which is a division of application No. 09/919,653, filed on Jul. 31, 2001, now Pat. No. 6,581,703.
(60) Provisional application No. 60/221,802, filed on Jul. 31, 2000.

(51) Int. Cl.[7] .................................................. B62D 6/00
(52) U.S. Cl. ..................................................... 180/6.2
(58) Field of Search ................................ 180/907, 904, 180/6.48, 6.5, 22, 24, 24.02, 6.06; 280/830, 838

(56) References Cited

U.S. PATENT DOCUMENTS

| | | | | | |
|---|---|---|---|---|---|
| 1,467,456 A | * | 9/1923 | Silvius | ......................... | 472/28 |
| 2,869,686 A | * | 1/1959 | Glanz | ......................... | 188/109 |
| 3,820,790 A | * | 6/1974 | Peterson | ................. | 273/129 R |
| 4,077,647 A | * | 3/1978 | Nagayama | .................. | 280/211 |
| 6,581,703 B2 | * | 6/2003 | Hammonds | ................. | 180/6.2 |

* cited by examiner

Primary Examiner—Lesley D. Morris
Assistant Examiner—Paul Royal, Jr.
(74) Attorney, Agent, or Firm—Gary L. Bush; Andrews Kurth LLP

(57) ABSTRACT

An omni direction vehicle with a frame having a round surface about its perimeter with no apparatus mounted on the frame extending beyond the perimeter. Two independent drive wheels located on an axis through the center of the frame are mounted at the same distance from a central vertical axis through the frame. Each wheel is powered independently of the other and can rotate at variable speeds in either direction. The vehicle is capable of movement in any direction by rotating the axis of the drive wheels to a position which is perpendicular to the desired direction of travel. The vehicle can spin about its vertical axis such that the axis of the drive wheels can be oriented at any direction without changing the original footprint of the space that the frame occupies over the ground. Thus, the vehicle requires a zero turning radius and requires only the space it occupies to change its forward orientation.

22 Claims, 9 Drawing Sheets

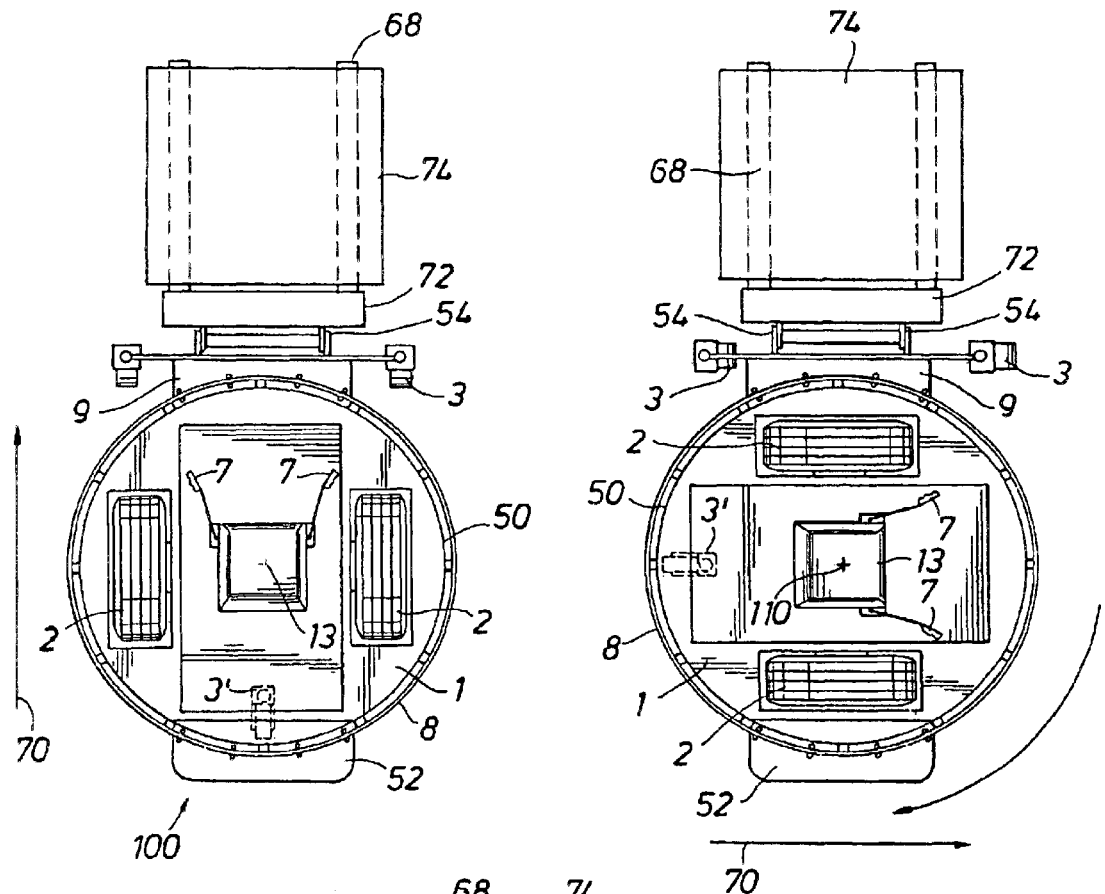
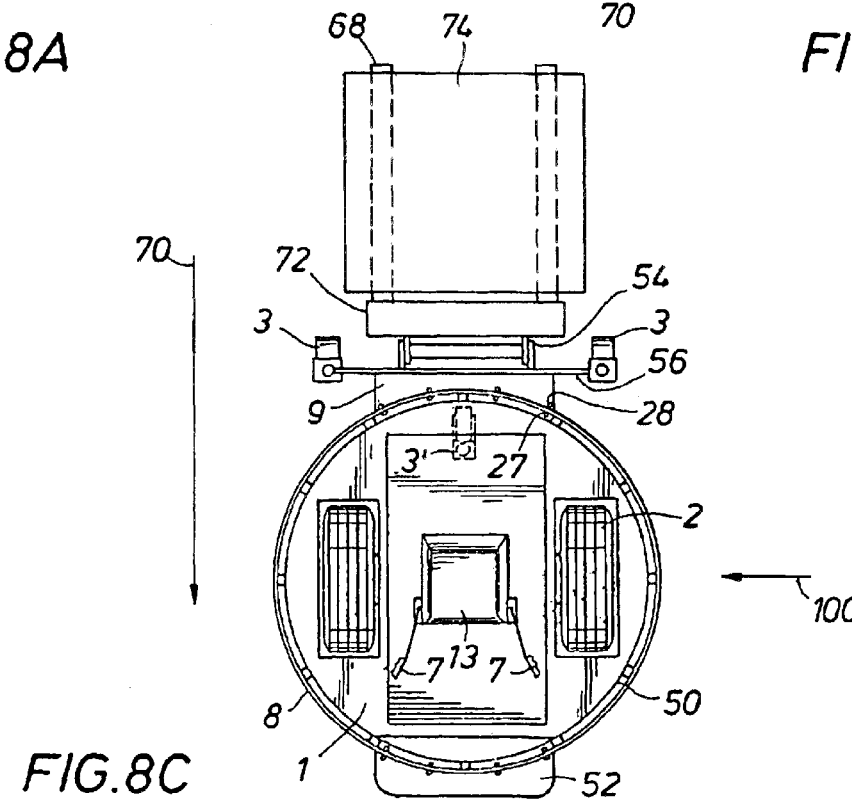
FIG.8A  FIG.8B  FIG.8C

OMNI DIRECTION VEHICLE WITH MATERIAL HANDLING TOOL

CROSS REFERENCE TO RELATED APPLICATION

This is a continuation-in-part of U.S. application Ser. No. 10/371,328, filed on Feb. 20, 2003, which is a division of U.S. application Ser. No. 09/919,653, filed on Jul. 31, 2001, now Pat. No. 6,581,703, which claims priority under 35 USC 119(e) from Provisional Application 60/221,802 filed on Jul. 31, 2000.

BACKGROUND OF THE INVENTION

1. Field of the Invention

This invention relates generally to a wheeled vehicle designed to turn about a vertical axis. In particular, the invention relates to powered utility riding vehicles of the type useful for construction, airport servicing operations, plowing, warehouse utility vehicles, wheelchairs, or any vehicle where rotation-in-place steering is advantageous.

2. Description of Prior Art

Prior art vehicles are known for turning with a zero turning radius, or so called "turning on the spot." U.S. Pat. No. 3,938,608 describes a vehicle with a single center mounted pivoting drive motor that is rotated about a vertical axis in order to change directions of the vehicle. The '608 vehicle is supported with three or more swivel wheels located at equal radial distances from the center wheel. The '608 outer profile is in the shape of a rectangle and has appendages that make close proximity maneuvering impossible next to another object such as a post or another vehicle. Furthermore, the '608 vehicle lacks tractive force because of the single drive wheel. Furthermore, a single drive wheel must be rotated in order to change the vehicle direction, and although the single drive wheel can be turned to direct the vehicle in any direction, it does not provide directional stability for the case where a force is exerted on the vehicle from an angle to the line of intended travel. For example, a force against the '608 vehicle at a 20° angle to the right or left of the line of travel would force the single '608 wheel to skid, causing loss of directional control.

Many prior art material handling vehicles, such as snow plows, use conventional vehicles designed for on-road use, equipped with a hydraulically powered plow blade attached to the front of the vehicle. Conventional vehicles are typically configured with two axles, one in front, the other in the rear. The rear axle is fixed to the vehicle and provides motive force; two additional wheels are located at the front end of the vehicle, each being steerable and connected together to provide steering of the vehicle. Since there is a distance between the fixed rear drive wheels and the axis of the steerable wheels at the front end of the vehicle, a turning radius is required that far exceeds the space actually occupied by the vehicle itself. The longer the distance between front and rear axles, the larger the turning radius that is required to change directions of the vehicle. A large turning radius makes maneuvering around tight areas difficult and often dangerous.

Another method for steering is embodied in a second category of prior art material handling vehicles, such as fork lifts. These vehicles, designed primarily for warehouse use, usually have two axles, with the rear axle having smaller, steerable wheels and the front axle having larger, non-steerable wheels. These vehicles may have smaller turn radii than the conventional on-road vehicles, because they have a shorter distance between the front and rear axles. Also, the rear wheels are often capable of turning at large angles. Typical minimum outside turn radii range from sixty to one hundred inches. In the case of fork lifts, it is advantageous to have as small a turn radius as possible; a smaller turn radius allows a narrower isle width and a concomitant increase in usable floor space for storage in a given warehouse.

Other prior art material handling vehicles, such as those with buckets used for moving earth and the like, use a concept called skid steering to obtain a zero turn radius. Vehicles using skid steering are called "skid steers." Skid steers consist of two axles each with powered, non-steerable wheels. All four wheels rotate in a plane parallel to the vehicle's longitudinal axis. Turning the skid steer is accomplished by rotating the two wheels on the left side of the vehicle at a different speed or in a different direction than the two right wheels.

Rotating the two left wheels at the same speed but in the opposite direction as the two right wheels turns the vehicle about a vertical axis located in the geometrical center of the four wheels, that is, along a zero turn radius. However, the wheels are not in line with the turn. They are dragged transversely across their normal straight line of travel, because the axles are not located on the vertical turn axis. On soft ground, such as turf, this method of turning is usually adequate, but on asphalt or concrete, skid steering results in lurching, scuff marks, and high tire wear.

With prior art material handling vehicles, an operator must often move in reverse to maneuver in tight spaces. Even with a zero turn radius skid steer, an operator often cannot turn in place because of the swing radius of the bucket. Operators are required to look over their shoulders in order to back up. In a congested location, hazards from reversing are increased. A need exists for a material handling vehicle that requires less square footage for its footprints as well as the space required for maneuvering so that operator safety and the safety of the surroundings are enhanced.

IDENTIFICATION OF OBJECTS OF THE INVENTION

A primary object of this invention is to provide a service vehicle that has enhanced maneuverability.

Another object of the invention is to provide a service vehicle that can turn on the spot without skid steering and be of the smallest physical size relative to the space it occupies.

Another object of the invention is to provide a service vehicle which reduces the risk of accidents which may result in damage or injury to equipment or operating personnel.

Another object of the invention is to provide a service vehicle having an outer perimeter that defines an outer imaginary cylinder that encloses any equipment or appendages rigidly mounted on the vehicle thereby enhancing its capability to maneuver the vehicle without impacting objects external to the vehicle.

Another object of the invention is to provide a service vehicle with utility tools mounted thereon for materials handling.

Another object of the invention is to provide a service vehicle that can be used for towing, plowing, pushing, sweeping, vacuuming, brushing, or lifting with a high degree of maneuverability.

Another object of the invention is to provide a vehicle that can turn on the spot, maneuver easily in limited spaces such as blind or interior corners, and maneuver around varying arcs such as curved curbs or cul-de-sacs and about obstructions such as posts, parked vehicles and buildings.

Another object of the invention is to provide a vehicle for pushing, plowing, lifting, or moving various solid materials such as snow, soil, gravel, or other materials which can be pushed by a blade or brush or vacuum or blower or scooped and lifted by a bucket scoop or forklift.

Another object of the invention is to provide a vehicle capable of plowing snow, ice, soil, etc. in continuous sweeping motions without stopping or reversing direction which minimizes lost load unproductive time.

Another object of the invention is to provide a vehicle for scooping, lifting and transporting buckets of snow, soil or the like with a zero turn radius without skid steering and without lifting the load high above the ground with a cantilevered lifting arm.

Another object of the invention is to provide a vehicle for moving palletized materials from one location to another with reduced maneuvering room, making it unnecessary to reverse and change directions as in the case of moving a pallet in a warehouse from one position on an isle laterally to another position on the same isle.

Another object of the invention is to provide a forklift that can transport a pallet either in front, to the side, or behind the driver thereby providing an unobstructed view for the driver.

Another object of the invention is to provide a vehicle having a lifting capability that is largely supported by an independent set of wheels, thereby reducing the amount of ballast or counterweight required to offset a load being transported.

SUMMARY OF THE INVENTION

The objects identified above along with other features and advantages of the invention are incorporated in a vehicle that provides unique maneuverability and efficiency, due to a combination of its characteristics including its shape and the configuration of its drive wheels. When the vehicle is combined with a radial movable hitch to its circular frame, such combination provides for free circumferential attachment to utility tools such as forks, buckets, plows, brushes, blowers, sweepers, and the like for material handling with minimal space required for maneuverability and safety of operation.

The vehicle includes a frame with a perfectly round outer ring about its perimeter having no external appendages. The ring has a perfect, unobstructed smooth circular surface defined by a vertical axis of the vehicle and a constant radius about the axis. The vehicle has two independent drive wheels located on a horizontal axis which intersects the vertical axis. Each wheel is at exactly the same distance from the vertical axis, with each wheel having the capability to move independently and at infinitely variable speeds in forward and reverse directions. Thus, the vehicle can move in any direction by rotating the axis of the drive wheels perpendicular to the desired direction of travel. By applying motive force to the wheels in the appropriate direction and speed, the vehicle can turn and move in any direction perpendicular to the axis of the drive wheels within the area covered by its circumference. The vehicle can rotate about the vertical axis to any radial heading without changing its original footprint. Accordingly, the vehicle requires a true zero turning or maneuvering radius, and thus requires only the space that it occupies in which to maneuver in any direction. The "footprint" is the area on the ground below the vehicle when it is at rest. The vehicle requires no maneuvering space beyond the area or footprint covered by the vehicle itself. The space required of the vehicle is no greater than that of a conventional vehicle with a drive axle and a steering axle.

In one embodiment of the invention, the vehicle has upper and lower rails on the round outer ring which support a trolley. The trolley includes a plurality of cams, precision wheels or rollers that are rotatably coupled to the upper and lower rails of the outer ring so that the trolley can move freely around the entire circumference of the outer ring of the vehicle. The trolley is the point of attachment for a utility tool, such as a bucket or plow, to the vehicle.

The trolley is able to freely rotate about the round outer ring, but it contains castors which come into contact with the ground. The operator of the vehicle in this configuration positions the vehicle relative to the tool on tool trolley by keeping the vehicle behind the tool. The motion is similar to backing up a vehicle with a towed trailer, except the operator is facing in the direction of motion. For example, if a snow plow assembly is attached at the tool trolley in front of the vehicle, the operator is able to steer the snow plow blade by slightly turning the vehicle to the right or the left. If the blade is allowed to get too far from the front center of the vehicle, its tendency is to pass down the side of the vehicle to the rear. In this case, the operator must "turn into the blade" to regain a position firmly behind the blade. An operator is able to quickly maneuver the snow plow blade in the same manner that a window washer expertly wields a squeegee. When a utility tool is stationary, the vehicle can move with respect to the stationary tool until a desired heading of the vehicle is achieved. The tool trolley can alternatively be fixed to the frame in various positions for those applications where it is desirable not to allow the trolley to freewheel. In a third embodiment, the tool trolley is affirmatively positioned relative to the vehicle frame by actuators, such as electric or hydraulic motors.

The trolley has top, bottom and side plates which form a box hitch assembly. The sides of the box hitch assembly include two outriggers, each of which support a swivel caster. The casters provide support for both a portion of the vehicle weight and most of the weight of the utility tool and load, if any, attached to the box hitch assembly. In the case of a soil bucket or fork lift, the box hitch assembly also supports a lifting tower with guides and lifting apparatus that supports and guides the bucket or forks which carry the load. The lifting tower provides for the vertical lift, tilting action, and support for scissor extension of the load bearing forks.

The caster wheels mounted at either end of the box hitch assembly provide stability for the round vehicle when positioned at various locations about the circumference of the vehicle either in-line with the direction of the drive wheels or at a position perpendicular to the axis of the drive wheels. Thus, the vehicle is capable of transporting the attachment and its load in any position about the circumference of the vehicle, with the caster wheels providing the stability and load bearing capacity for the attachment.

The vehicle can move omni-directionally about a given point, change directions with zero maneuvering room beyond the physical footprint of the vehicle, and push or carry material with precise control. Such capabilities reduce the operating space on the ground required to move or handle an object being manipulated, thus increasing operating efficiency. Safety is increased because the operator of such a vehicle, positioned directly at the center of the vehicle, can always be facing the direction the vehicle is moving, never having to back up and look backward.

BRIEF DESCRIPTION OF THE DRAWINGS

The invention is described below with reference to preferred embodiments which are illustrated by the attached drawings of which:

FIGS. 8A–8C are top views of an ODV according to the invention configured as a fork lift, showing how the ODV safely maneuvers in its own footprint while retrieving a load;

DESCRIPTION OF THE PREFERRED EMBODIMENTS OF THE INVENTION

Figure 1A:
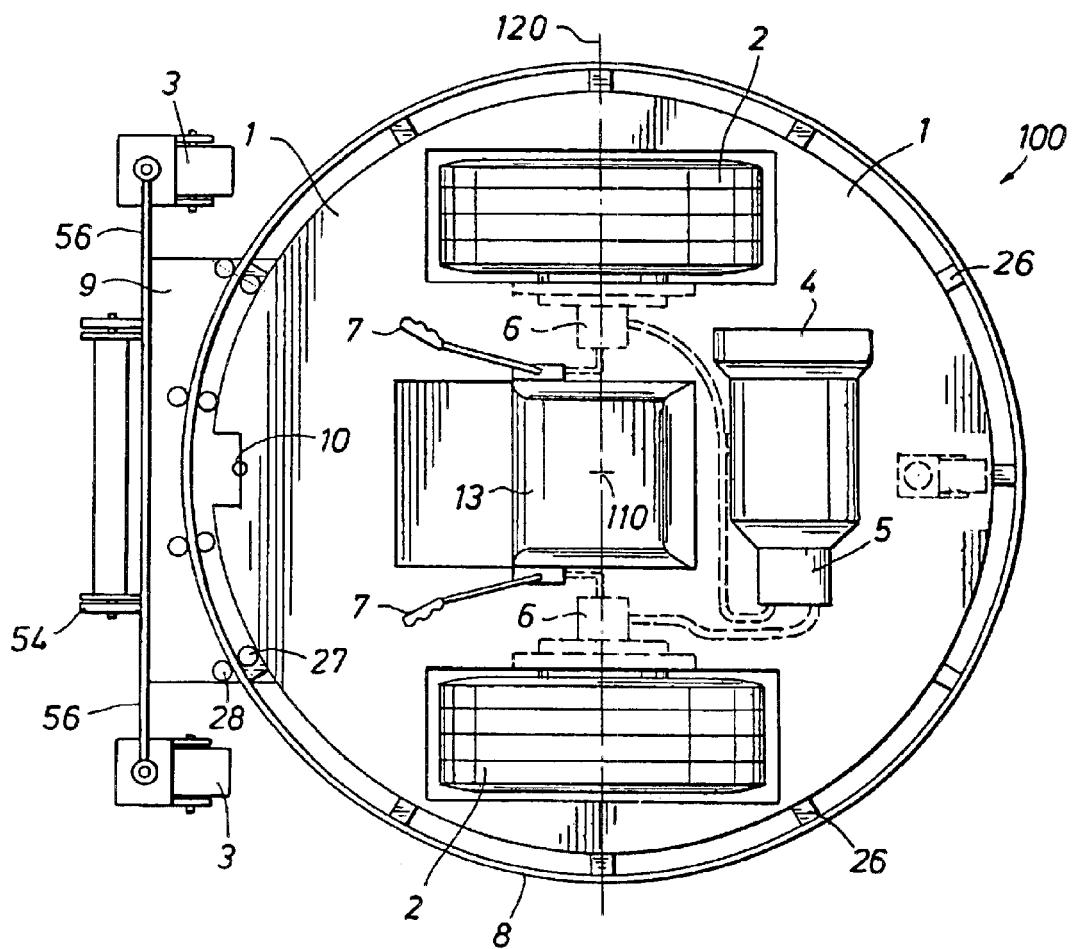
FIGS. 1A and 1B are top and side views, respectively, of the Omni Direction Vehicle (ODV) according to the invention schematically showing major drive components, a circular rail about the frame of the ODV, and a tool trolley rotatably mounted on the rail.
Figure 1B:
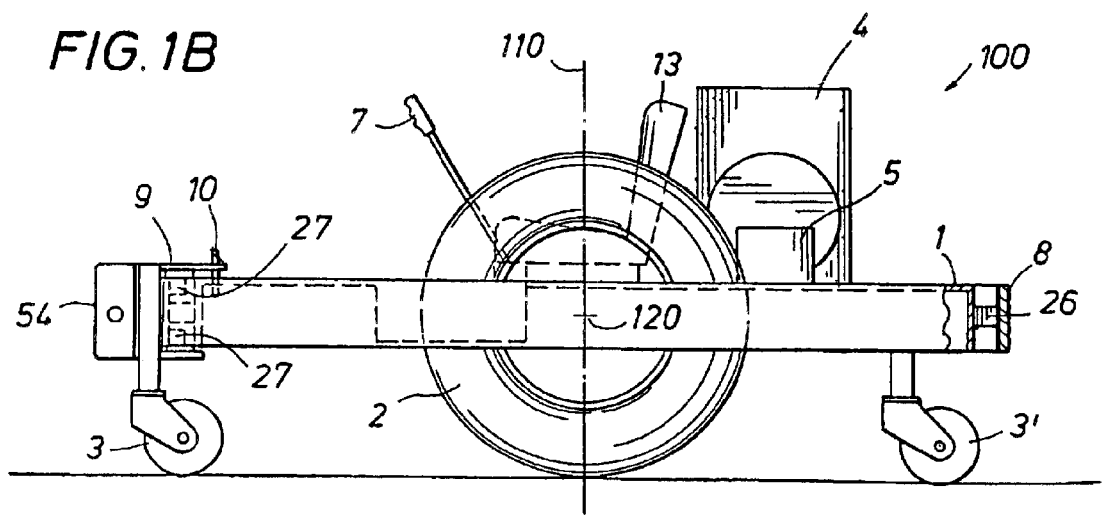

FIGS. 1A and 1B illustrate an Omni Directional Vehicle 100 (hereafter ODV) according to the invention which includes primary wheels 2 mounted on a frame 1 which has an outer perimeter in the shape of a circle. The circular frame has a vertical axis 110, illustrated in FIG. 1B, which is perpendicular to the plane of the top view of FIG. 1A. The wheels 2 are mounted along a horizontal axis 120 which intersects the vertical axis 110 as shown in FIGS. 1A and 1B.

A power source 4 mounted on the frame 1 is provided for driving a hydraulic pump 5. The power source 4 may be a diesel or gasoline engine or an electric motor/battery assembly. The pump 5 provides balanced pressurized hydraulic fluid to separate hydraulic motor 6 gearbox assemblies, one for each wheel 2. The speed and direction of rotation of motors 5 and wheels 2 is controlled by control levers 7 which operate hydraulic control valves (not illustrated) coupled to hydraulic motors 6. The control levers 7 and valves operate exactly the same for each of the left and right wheels 2. Each lever 7 and valve has a neutral position, such that when a lever is at such neutral position, a wheel associated with that lever is hydraulically braked. If a lever is moved forward, the wheel motor 6 begins to move slowly forward for turning a respective wheel 2. The greater distance that a lever 7 is pushed or pulled from its neutral position, the faster the wheel motor 6 turns, thereby causing the wheel 2 to which it is coupled to increase in speed. A seat 13 for the operator is mounted on frame 1 with the vertical axis 110 passing through it.

If both levers 7 are moved in the same direction and amount and at the same time, both drive wheels 2 move at the same speed, thereby causing straight-ahead movement of the ODV over the ground. That movement is perpendicular to the horizontal axis 120. If the levers 7 are pushed forward or backward at an unequal distance from each other, a lever moved the greatest distance will produce a greater speed of rotation than the other one, causing the vehicle to turn with the vehicle turning about the wheel that is turning slower. For example, if the right control lever 7 is pushed farther forward than is the left lever 7, the ODV 100 turns to the left, and vice versa.

If the right lever 7 is moved forward and the left lever 7 is moved backward, and both lever positions are the same in amount and opposite in direction, the left wheel turns backward, the right wheel turns forward both at the same rate of rotation, and the ODV 100 turns in its own space or footprint without moving from that footprint while it is turning. The footprint over the ground is the area of the ground beneath the circular frame 1. The counter-clockwise rotation described above becomes a clockwise rotation when the right wheel 2 rotates backward at the same rate as the forward rotation of the left wheel 2. Thus, the ODV 100 in its basic form can change its heading while not varying its footprint over the ground during such a change of heading. That means that if the ODV does not interfere with any object on the ground at one heading, that heading can be changed without fear of interfering with any object on the ground, because the ODV footprint does not change during heading correction.

The hitch rail or ring 8 is mounted to the frame 1 with plurality of mounting plates or stanchions 26. The hitch rail 8 provides a smooth running surface for a tool trolley assembly 9. Tool trolley 9 has eight cams 27 located inboard of the rail 8 and eight cams 28 located outboard of the rail 8 which rotatably capture rail 8 with substantially no looseness. The tool trolley is the point of attachment to the vehicle 100 for any of a variety of utility tools.

The tool trolley assembly 9 may be allowed to freely rotate about rail 8, may be manually rotated, or may be positioned by a powered assembly with an electric or hydraulic motor, for example. A latch or pin 10 between rail 8 and tool trolley 9 can be activated so that the otherwise freewheeling trolley moves with the vehicle 100 when required.

Tool trolley 9 has top, bottom and side plates which form a box hitch assembly 54, used for mounting one of a myriad of utility tools, such as a soil bucket, forklift, or plow, to ODV 100. Tool trolley 9 also has two outriggers 56 which support swivel wheels or castors 3. The casters 3 provide balancing support for both a portion of the vehicle 100 weight and the entire weight of the utility tool and load, if any, attached to the box hitch assembly 54. Power source 4 is used to counterbalance the ODV 100 and keep the frame 1 substantially level when a heavy load is carried at hitch assembly 54. Depending on the configuration of ODV 100, a third swivel castor 3' may be necessary to provide balance when hitch 54 is unloaded. Third castor 3' may be mounted to frame 1 near power source 4 or attached to counterweight trolley 52. (See FIG. 7) If mounted on frame 1, the castor 3' is mounted at a position so as not to protrude from the outer circumference of the vehicle when the vehicle is turning about itself (i.e., spinning about vertical axis 110) in order to assure that there are no external appendages on the vehicles that could touch or catch other objects while the ODV 100 is spinning about axis 110.

Figure 2:
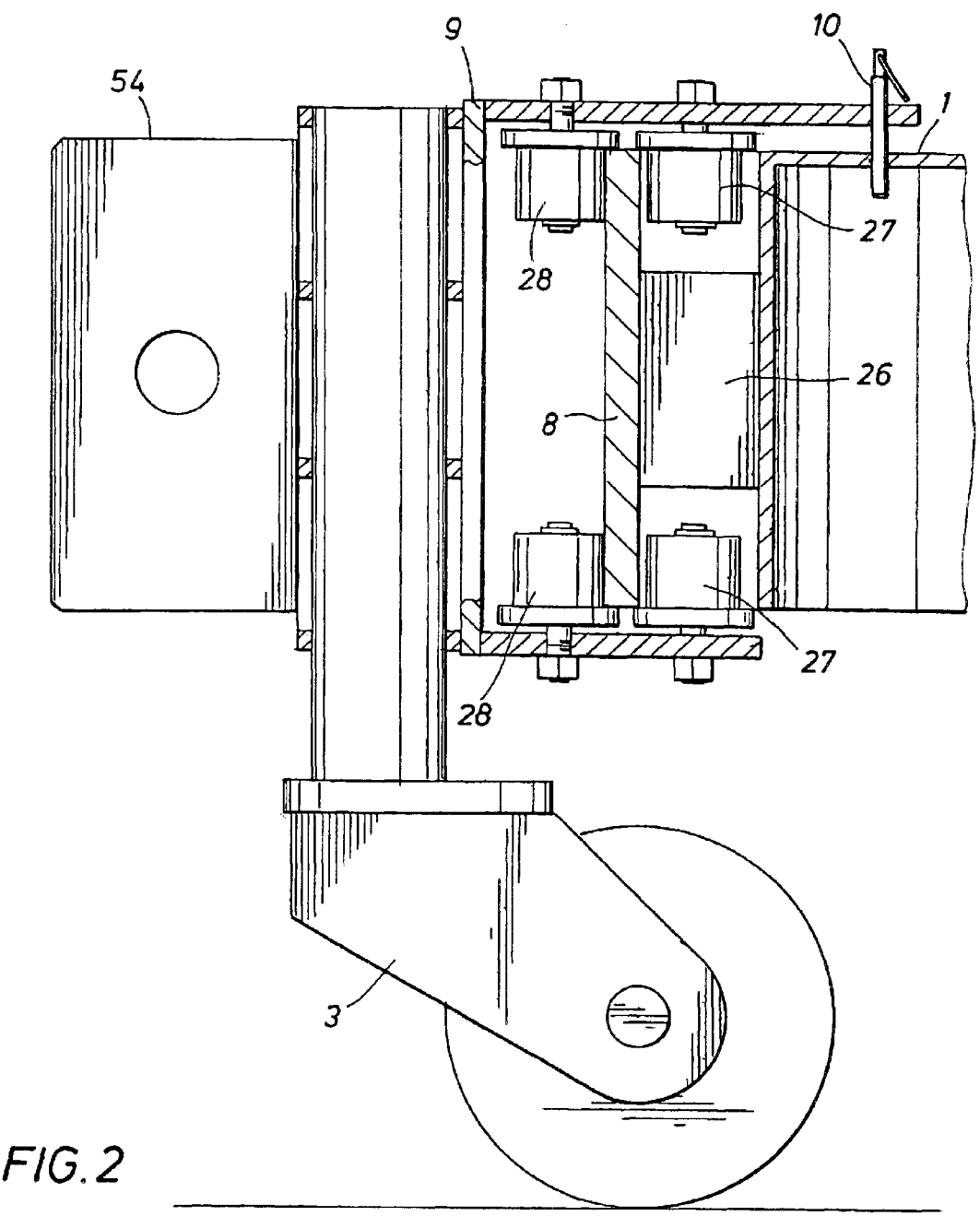
FIG. 2 is a side section view of a box hitch assembly mounted on the tool trolley with a detailed illustration of the rotatable mounting of the trolley on the circular rail of the ODV.

FIG. 2 illustrates a side view of the hitch rail 8 and its attachment to the main frame 1 with stanchions 26 spaced around the circumference of the vehicle. Trolley cams 27, 28 located adjacent to and at the top and the bottom of rail 8 support the trolley 9 and provide a mounting platform for various hitches and connections to the ODV 100. The cams are positioned preferably with four upper and four lower cams 27 set inboard of the rail 8, and with four upper and four lower cams 28 set outboard of the rail 8. The mounting positions of the inboard cams 27 and the outboard cams 28 match the curvature of the rail 8, thus allowing the trolley 9 to rotate smoothly with minimum friction and resistance about rail 8. The number and size of cams may vary depending on load being applied.

Figure 3A:
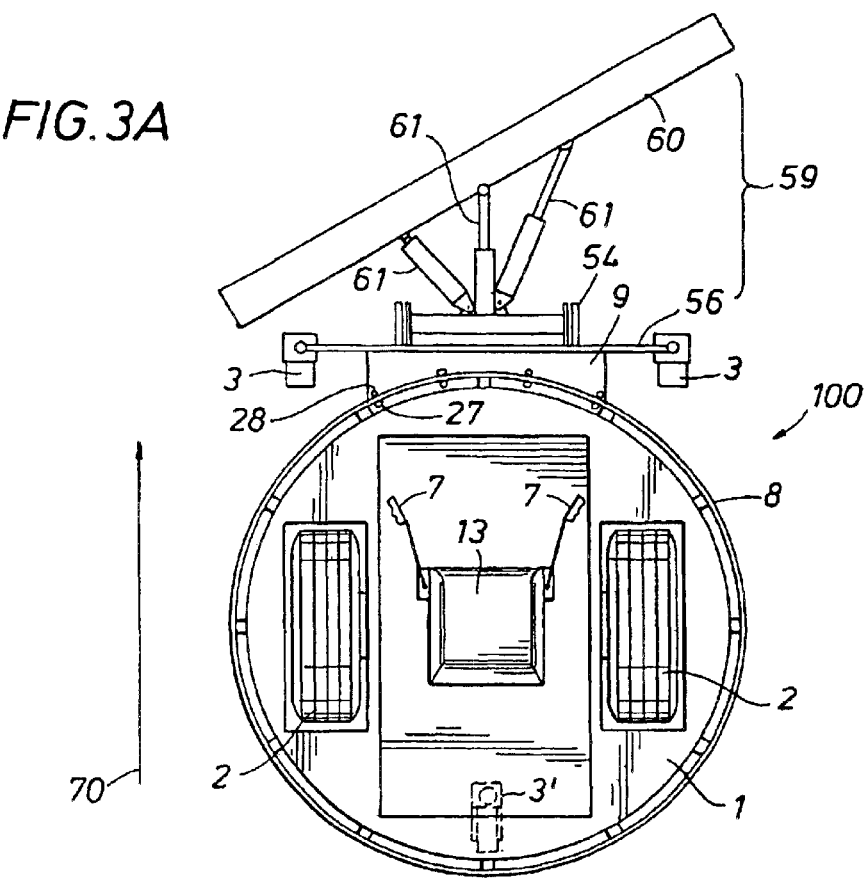
FIGS. 3A and 3B are illustrations of the ODV configured as a snow plow with a blade assembly located to the front and to the side of the ODV, respectively.
Figure 3B:
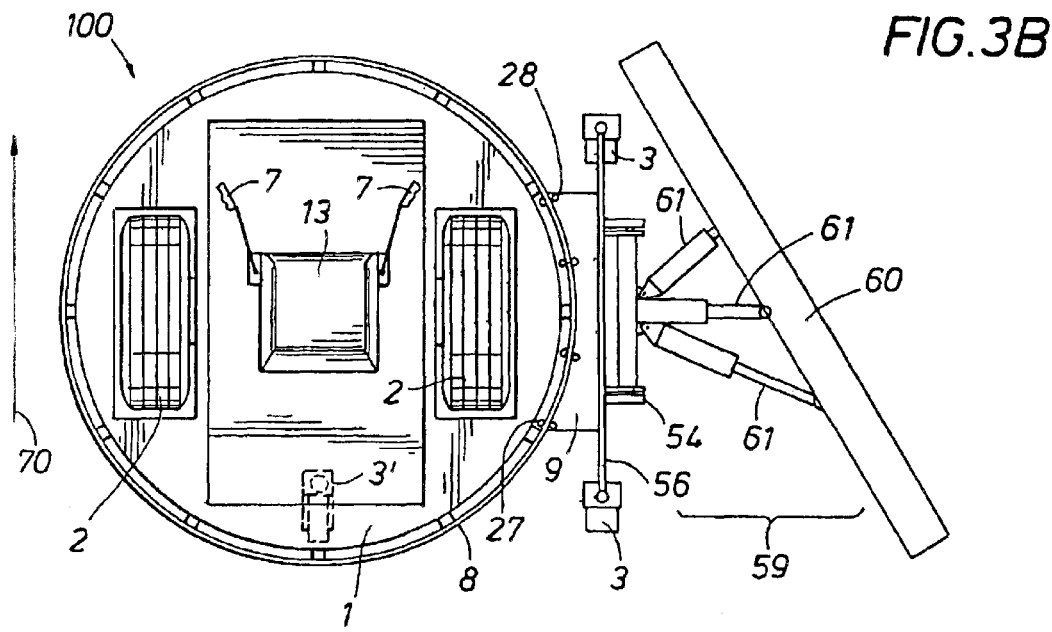

FIGS. 3A and 3B show the ODV 100 configured as a snow plow, with plow assembly 59 mounted at box hitch assembly 54. Plow assembly 59 comprises a blade 60 and a number of actuators 61 which can raise, lower and change the angle of attack of blade 60. The actuators 61 are preferably hydraulic, powered by pump 5. In FIG. 3A, the plow assembly 59 is positioned in front of the vehicle 100, similar to conventional snow plows. The direction of movement is shown by arrow 70. In FIG. 3B, the plow assembly 59 is positioned to the right side of the vehicle. The direction of movement is shown by arrow 70. The snow plow of the configuration of FIGS. 3A, 3B can maneuver in very limited spaces including interior corners, along various arcs such as curved curbs and cul-de-sacs, and around posts, buildings, parking lots and other odd-shaped obstructions.

Figure 4A:
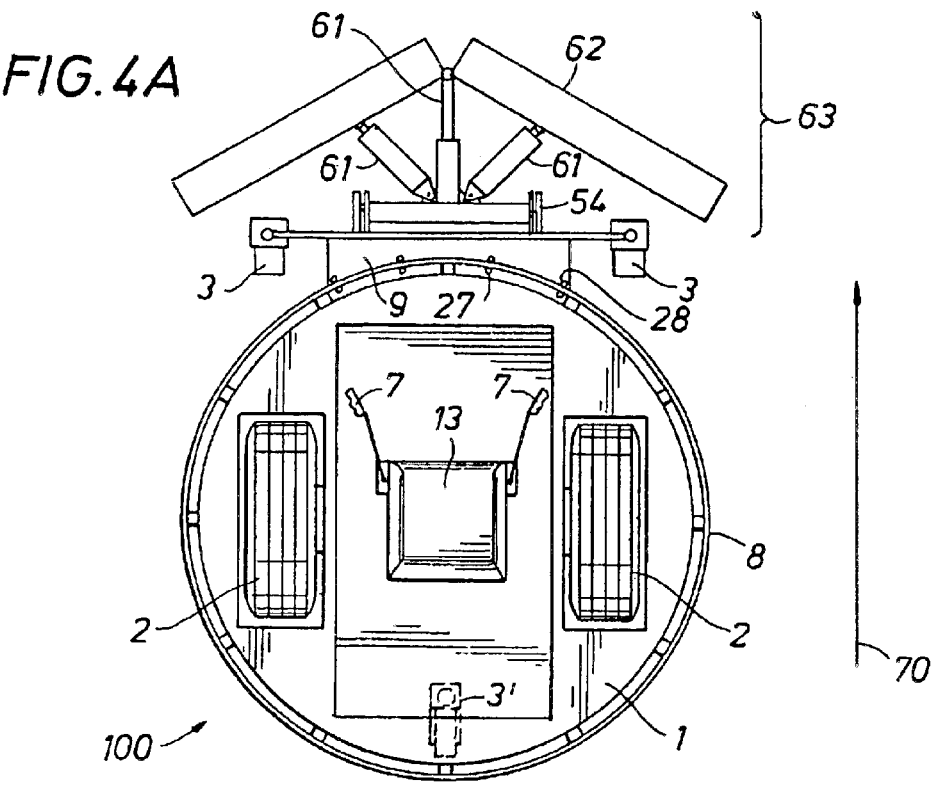
FIGS. 4A and 4B illustrates an ODV configured with a V-type snow plow with a plow assembly located to the front and to the side of the ODV, respectively.
Figure 4B:
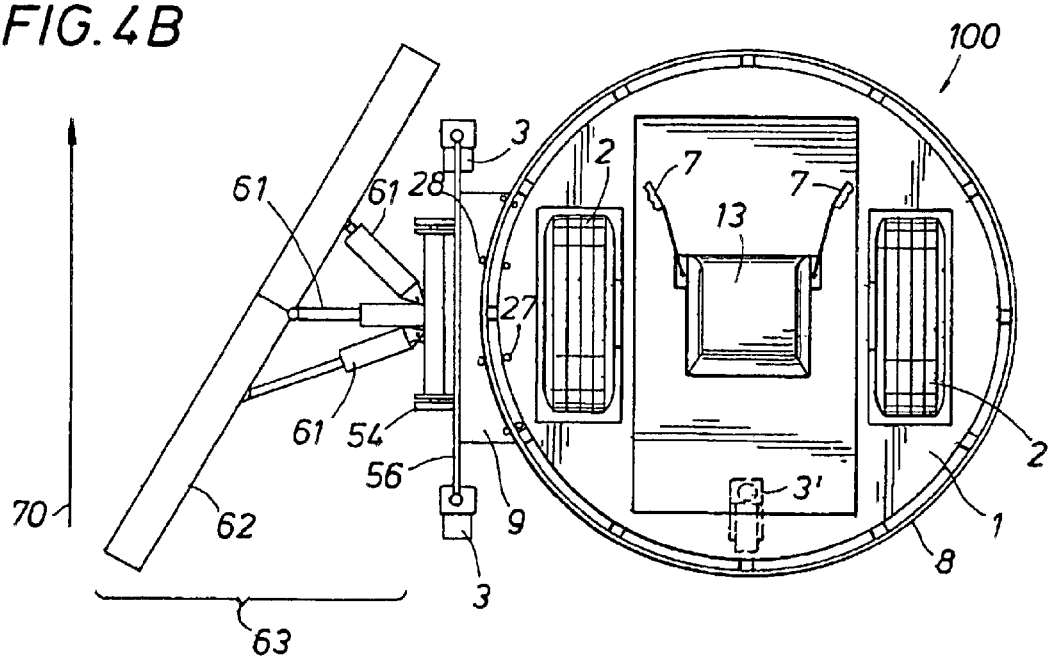

FIGS. 4A and 4B show the ODV 100 configured as a V-shaped blade snow plow, with V-blade plow assembly 63 mounted at box hitch assembly 54. V-blade plow assembly 63 comprises a hinged V-blade 62 and a number of actuators 61 which can raise, lower and change the angle of attack of hinged V-blade 62 The actuators 61 also control whether the hinged V-blade assembly 62 is folded or straight. The actuators 61 are preferably hydraulic, powered by pump 5. In FIG. 4A, the V-blade plow assembly 63 is configured in the 'V' shape and positioned in front of the vehicle 100. The direction of movement is shown by arrow 70. In FIG. 4B, the V-blade plow assembly 63 is set in a straight line configuration and positioned to the left side of the vehicle. The direction of movement is shown by arrow 70. The snow plow of the configuration of FIGS. 4A, 4B can maneuver in very limited spaces including interior corners, along various arcs such as curved curbs and cul-de-sacs, and around posts, buildings, parking lots and other odd-shaped obstructions.

Figures 5, 6:
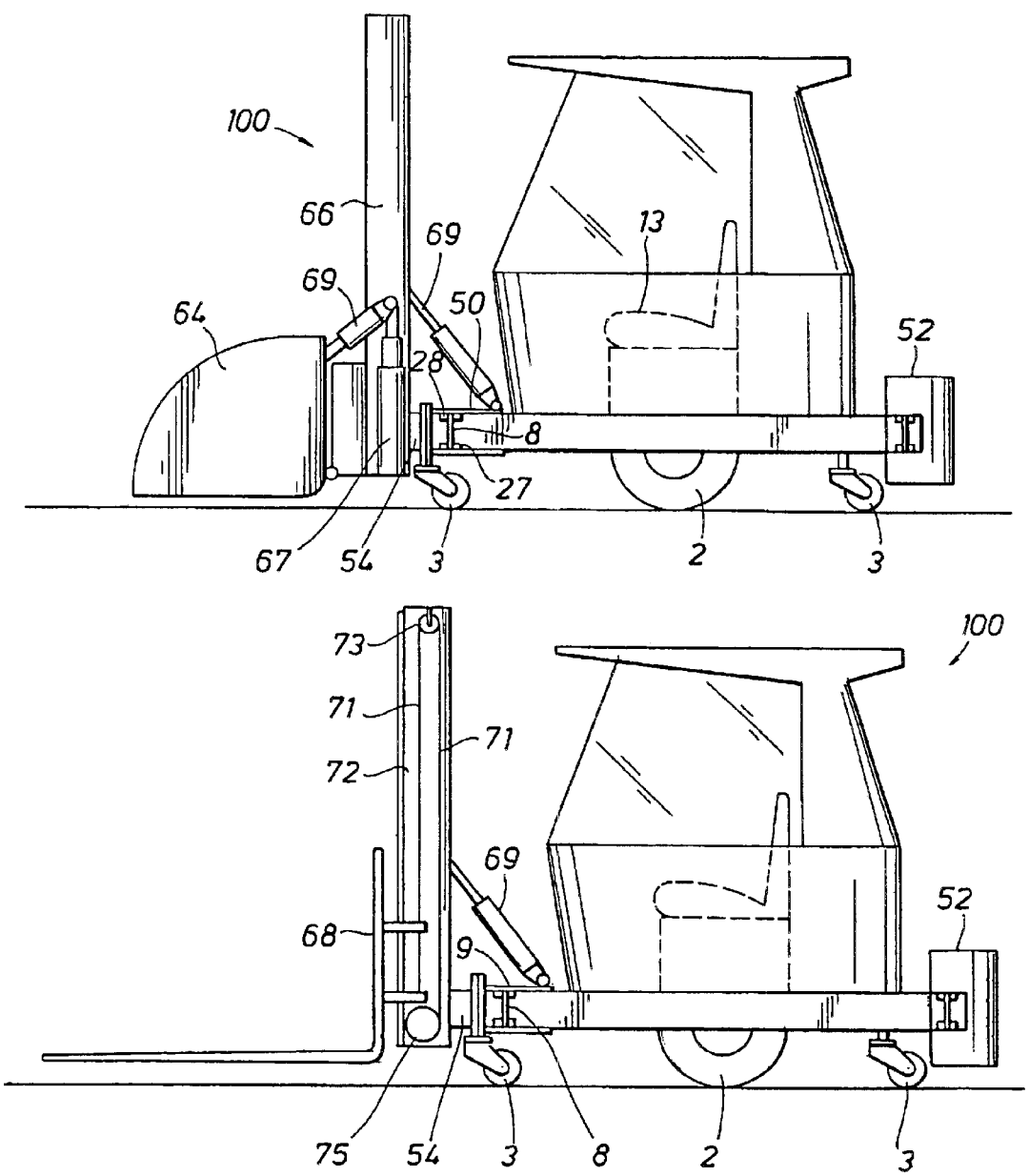
FIG. 5 illustrates an ODV according to the invention configured as an earth mover equipped with a soil bucket and a lifting tower.
FIG. 6 illustrates an ODV according to the invention configured as a fork lift equipped with cargo forks and a lifting tower.

FIG. 5 shows ODV 100 configured with a soil bucket 64 mounted on box hitch assembly 54. In the case of a soil bucket, the box hitch assembly 54 also supports a lifting tower 66 which guides and supports the bucket 64. The lifting tower 66 includes a lifting apparatus 67 and a tilt actuator 69 for both vertical lift and tilting action of soil bucket 64. Lifting apparatus 67 and tilt actuator 69 are preferably hydraulic, powered by pump 5 (FIGS. 1A–1B).

Similarly, FIG. 6 shows ODV 100 configured with a fork lift 68 mounted on box hitch assembly 54. In the case of a fork lift, the box hitch assembly 54 also supports a lifting tower 72 which guides and supports forks 68. The lifting tower 72 houses components for providing vertical lift of forks 68: A drive chain 71, sprocket block 73, and chain winch 75. A tilt actuator 69 provides for tilting of forks 68. Chain winch 75 and tilt actuator 69 are preferably hydraulic, powered by pump 5 (FIGS. 1A–1B).

Figure 7:
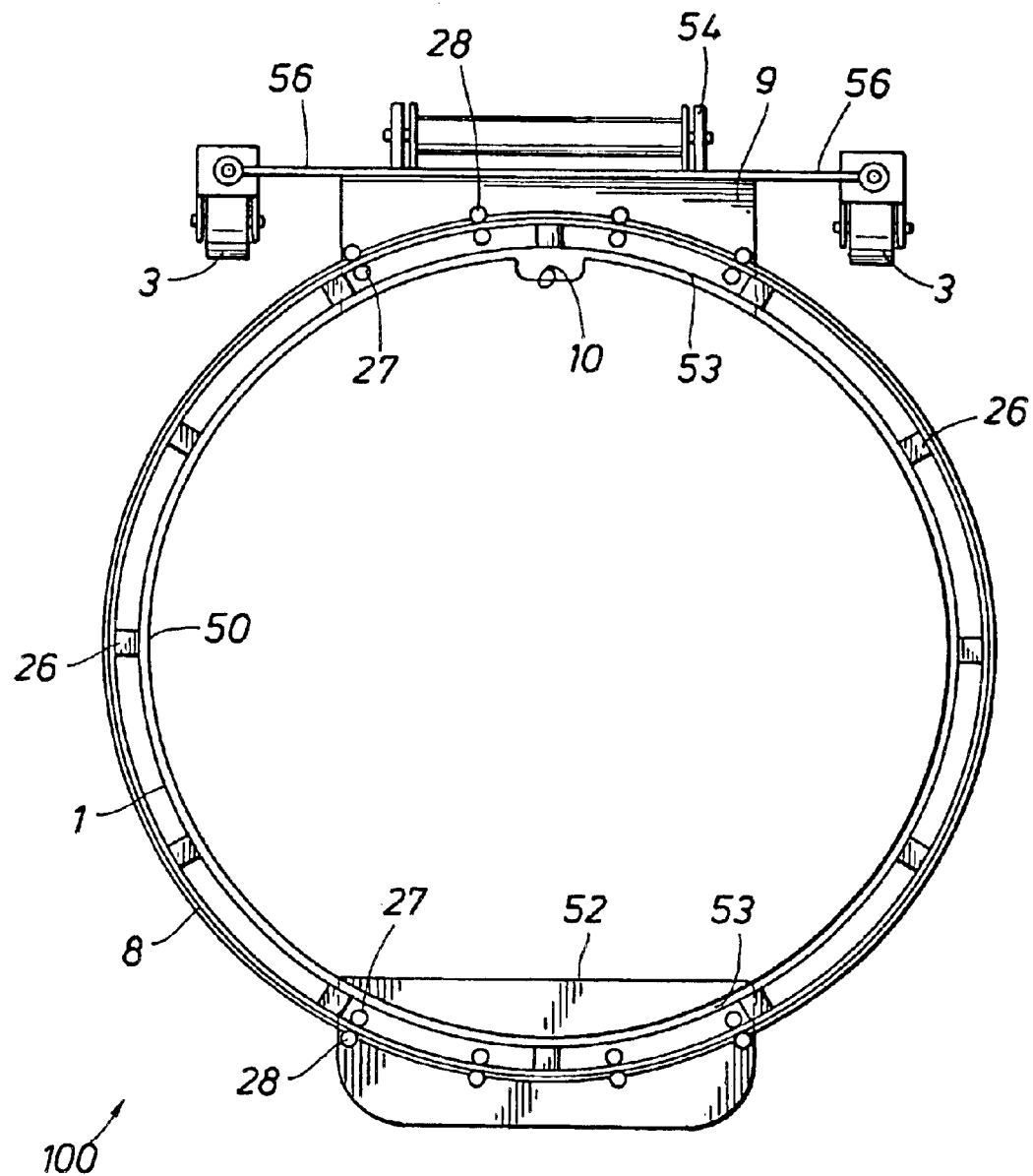
FIG. 7 is a top view of an ODV with an auxiliary balancing weight at its rear end which balances weight carried by a fork or soil bucket at its front end.

FIGS. 5 and 6 also show an optional counterweight trolley 52, which is designed and arranged to rotate around ring 8 in a similar manner as tool trolley 9 as illustrated in FIG. 2. Counterweight trolley 52 has eight cams 27 located inboard of the rail 8 and eight cams 28 located outboard of the rail 8 which rotatably capture rail 8 with substantially no looseness. Counterweight trolley 52 may be used when a particularly heavy load is to be carried by tool trolley 9. When used, counterweight 52 should remain 180 across from tool trolley. FIG. 7 shows a simplified plan view of ODV 100 with both a tool trolley 9 and a counterweight trolley rotatably coupled to ring 8. A ring-like linkage 50 is coupled to both tool trolley 9 and counterweight trolley 52 with pins 53. Ring 50 prevents tool trolley 9 and counterweight trolley 52 from moving relative to each other but allows them to rotate as a unit relative to frame 1.

FIGS. 8A–8C are plan views of the ODV of FIG. 6 with fork lift 68 and lift tower 72 installed, carrying a load 74. In each figure, arrow 70 shows the direction of travel of ODV 100. These figures show the capability of ODV 100 to maneuver in tight spaces. FIG. 8A shows ODV 100 having approached and picked up load 74 with fork 68. In FIG. 8B, the ODV is rotating about its vertical axis 110 with load 74 remaining stationary. FIG. 8C shows the ODV departing with load 74, traveling in a direction opposite that shown in FIG. 8A. At all times in the sequence of retrieving load 74, the operator is facing toward the direction of motion.

Figure 9:
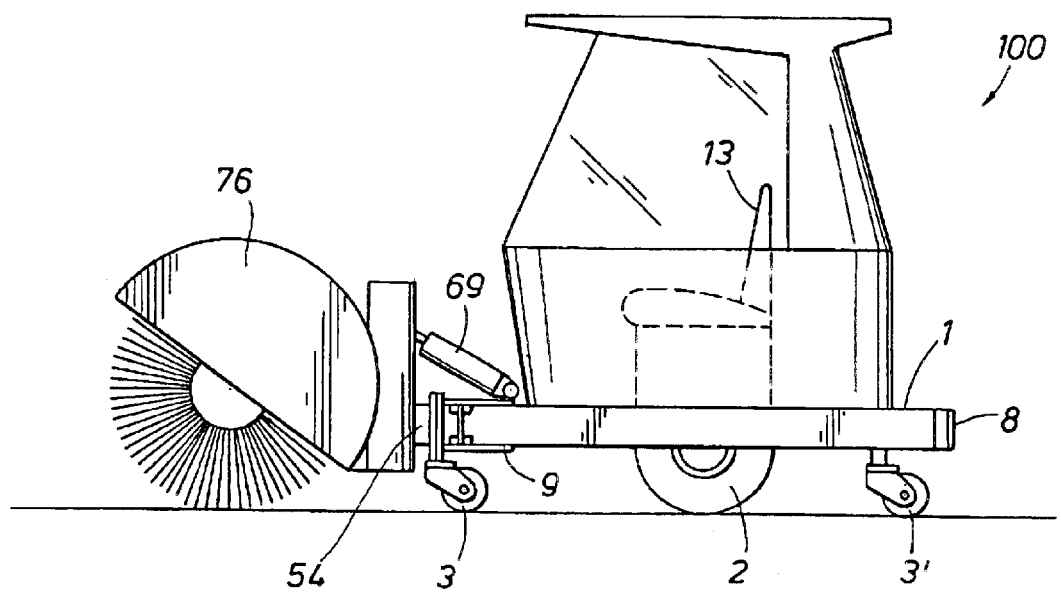
FIG. 9 is a side view of an ODV according to the invention configured as a sweeper with a rotary broom.
Figure 10:
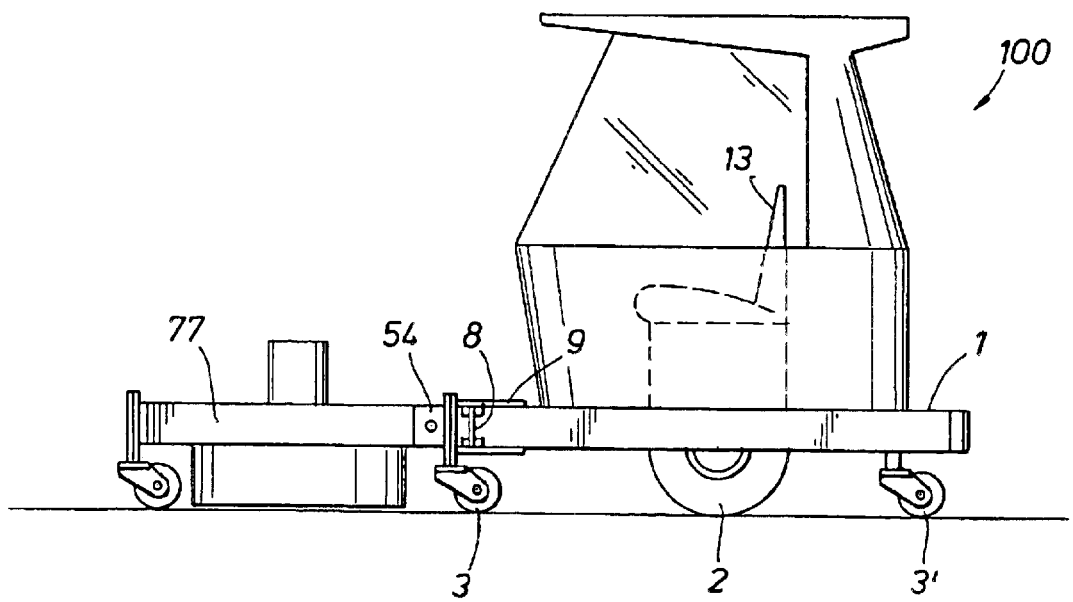
FIG. 10 is a side view of an ODV according to the invention configured as a mowing machine.
Figure 11:
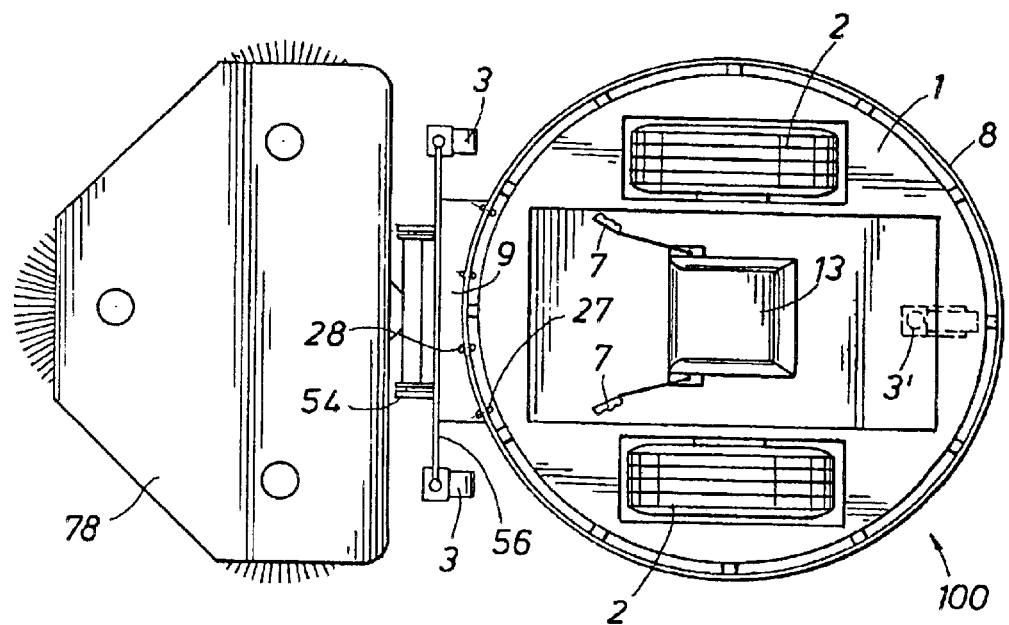
FIG. 11 is a top view of an ODV according to the invention configured with a rotary scrubbing brush assembly.
Figure 12:
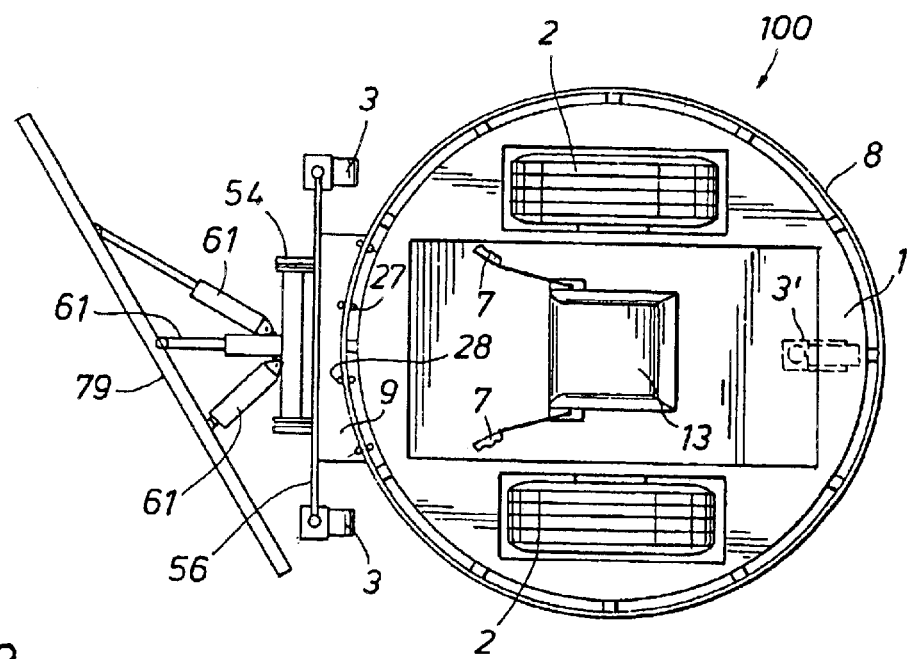
FIG. 12 is a top view of an ODV according to the invention configured with a pavement squeegee.

FIG. 9 shows ODV 100 configured with a rotary broom assembly 76 mounted on box hitch assembly 54. An actuator 69 vertically positions the broom assembly 76. FIG. 10 shows ODV 100 configured with a rotary mower attachment 77 mounted on box hitch assembly 54. FIG. 11 shows ODV 100 having a rotary scrubbing brush system 78 as the utility tool, and FIG. 12 shows ODV 100 configured as a pavement squeegee, with a squeegee 79 attached at hitch 54 and actuators 61 for vertically, horizontal positioning of the squeegee 79. Other configurations are possible such as the ODV 100 having a vacuum or a spreader attachment.

The various utility tools described above generally require power in order to function. Hydraulic power may be supplied by pump 5 (or by another pump coupled to power source 4). A hydraulic swivel (not shown) centered on vertical axis 110 (FIGS. 1A, 1B) and coupled between pump 5 and the utility tool is provided to allow unrestricted rotation of the tool trolley 9 about the ODV 100. Alternatively, long flexible hydraulic pressure hoses run from the pump to the trolley to provide hydraulic control fluid to tools connected to the trolley.

As described above, the Omni Direction Vehicle of the invention is characterized by a perfectly round outer perimeter with no appendages mounted to the frame extending radially from that outer perimeter that can hang up or catch on objects or equipment on the ground. The ODV arrangement with drive or main wheels positioned along a horizontal axis that runs through the center of the circular frame, and where both wheels function independently of each other in forward and rearward directions, provides a basis for many service vehicles, some of which are described above.

The invention as described above is defined by the claims which follow.

What is claimed is:

1. A powered vehicle (100) comprising,
    a frame (1) having a shape of a circular disk with a vertical axis (110) defined at the center of said circular disk,
    first and second drive wheels (2) coupled to said frame, each of said drive wheels capable of powered rotation about a horizontal axis (120) disposed about through said vertical axis, each of said drive wheels capable of forward and rearward rotation about said horizontal axis, means (4, 5, 6, 7) for independently controlling the direction of rotation and the speed of said first and second drive wheels, a trolley (9) rotatably coupled about the outer perimeter of said frame, a material handling tool mounted on said trolley, first and second castors (3) mounted on said trolley (9) for supporting said frame on the ground, whereby when said first and second drive wheels are rotated in opposite directions and at substantially the same speed, said vehicle spins generally about said vertical axis.

2. The vehicle of claim 1 further comprising, a circular rail (8) disposed about the outer perimeter of said frame, and said trolley (9) is rotatably mounted on said rail.

3. The vehicle of claim 1 further comprising a hitch (54) mounted on said trolley designed and arranged for coupling to a tool.

4. The vehicle of claim 1 further comprising, a free spinning wheel (3') rotatably mounted to said frame for supporting said frame on the ground, said free spinning wheel capably of aligning in any horizontal direction.

5. The vehicle of claim 1 further comprising an operator seat (13) mounted on said frame at a position intersected by said vertical axis and between said first and second drive wheels.

6. The vehicle of claim 5 further comprising a first control lever (7) positioned on a first side of said operator seat, said first control lever operatively coupled to a first power source (6) for controlling the speed and direction of rotation of a first drive wheel, and a second control lever (7) positioned on a second side of said operator seat, said second control lever operatively coupled to a second power source (6) for controlling the speed and direction of rotation of a second drive wheel, wherein each of said first and second drive wheels are controlled independently of each other.

7. The vehicle of claim 1 further comprising a latch (10) removably coupled between said frame and said trolley and designed and arranged to prevent movement therebetween.

8. The vehicle of claim 1 further comprising a first outrigger (56) mounted between said first caster and said trolley, and a second outrigger (56) mounted between said second caster and said trolley.

9. The vehicle of claim 1 further comprising, a counterweight (52) rotatably coupled about the outer perimeter of said frame.

10. The vehicle of claim 9 further comprising a linkage (50) disposed between said trolley and said counterweight and attached therebetween, said linkage being rotatably independent from said frame and designed and arranged to cover said trolley and said counterweight to rotate in coordination with respect to said frame.

11. The vehicle of claim 1 further comprising a plow assembly (59, 63) selectively coupled to said trolley, said plow assembly having a blade (60, 62) and at least one actuator (61) coupled between said blade and said trolley which is designed and arranged for horizontal and vertical positioning of said blade.

12. The vehicle of claim 1 further comprising a soil bucket assembly selectively coupled to said trolley.

13. The vehicle of claim 12 wherein said soil bucket assembly includes, a bucket (64), a lifting tower (66) coupled to said trolley designed and arranged to support and guide said bucket, said bucket having a hinge slideably coupled to said lifting tower, a tilting actuator (69) coupled between said trolley and said bucket designed and arranged to tilt said bucket about said hinge, and a lifting apparatus (67) coupled between said lifting tower and said bucket and designed and arranged to vertically position said bucket with respect to said lifting tower.

14. The vehicle of claim 1 further comprising a fork lift assembly selectively coupled to said trolley.

15. The vehicle of claim 14 further comprising a fork (68), a lifting tower (72) coupled to said trolley designed and arranged to guide and support said fork, said fork slideably coupled to said lifting tower, a tilting actuator (69) coupled between said lifting tower and said trolley designed and arranged to tilt said lifting tower, and a lifting apparatus (71, 73, 75) coupled between said lifting tower and said fork designed and arranged to vertically position said bucket with respect to said lifting tower.

16. The vehicle of claim 1 further comprising a broom (76) coupled to said trolley, and an actuator (69) coupled between said broom and said trolley and designed and arranged for vertical positioning of said broom.

17. The vehicle of claim 1 further comprising a mower assembly (77) coupled to said trolley.

18. The vehicle of claim 1 further comprising a squeegee (79) coupled to said trolley, and an actuator (61) coupled between said squeegee and said trolley designed and arranged for horizontal and vertical positioning of said squeegee.

19. The vehicle of claim 1 further comprising a rotary brush (78) coupled to said trolley.

20. The vehicle of claim 1 further comprising a vacuum coupled to said trolley.

21. The vehicle of claim 1 further comprising a spreader coupled to said trolley.

22. An omni direction vehicle comprising, a frame with an outer rail which is in the shape of a circle defined about a vertical axis through said frame, first and second drive wheels coupled to said frame, each of said drive wheels capable of powered rotation about a horizontal axis and capable of forward and rearward rotation about said horizontal axis, a trolley rotatably supported on said rail and by two casters and including a hitch for coupling to a material handling tool, said vehicle having a power source mounted on said frame and arranged and designed to rotate said first and second drive wheels.

* * * * *